United States Patent
Györi

(10) Patent No.: US 9,030,142 B2
(45) Date of Patent: May 12, 2015

(54) CIRCUIT ARRANGEMENT AND METHOD AND DEVICE FOR OPERATING THE CIRCUIT ARRANGEMENT

(75) Inventor: Csaba Györi, Wiesbaden (DE)

(73) Assignee: Continental Automotive GmbH (DE)

(*) Notice: Subject to any disclaimer, the term of this patent is extended or adjusted under 35 U.S.C. 154(b) by 218 days.

(21) Appl. No.: 13/574,839

(22) PCT Filed: Dec. 8, 2010

(86) PCT No.: PCT/EP2010/069126
§ 371 (c)(1),
(2), (4) Date: Jul. 24, 2012

(87) PCT Pub. No.: WO2011/095246
PCT Pub. Date: Aug. 11, 2011

(65) Prior Publication Data
US 2012/0286710 A1 Nov. 15, 2012

(30) Foreign Application Priority Data

Feb. 4, 2010 (DE) .......................... 10 2010 001 593

(51) Int. Cl.
| | |
|---|---|
| *H02P 7/00* | (2006.01) |
| *H02P 6/00* | (2006.01) |
| *B62D 5/04* | (2006.01) |
| *H02P 29/02* | (2006.01) |

(52) U.S. Cl.
CPC .............. *H02P 6/005* (2013.01); *B62D 5/0487* (2013.01); *H02P 29/022* (2013.01)

(58) Field of Classification Search
USPC .......... 318/432, 434, 800, 801, 802, 805, 812
See application file for complete search history.

(56) References Cited

U.S. PATENT DOCUMENTS

| | | | |
|---|---|---|---|
| 4,434,389 A | 2/1984 | Langley et al. | |
| 4,896,088 A | 1/1990 | Jahns | |
| 5,414,339 A * | 5/1995 | Masaki et al. ................. | 318/800 |
| 6,384,567 B1 * | 5/2002 | Maeda ........................... | 318/801 |
| 2001/0036097 A1 * | 11/2001 | Kikuchi et al. ............... | 363/131 |

(Continued)

FOREIGN PATENT DOCUMENTS

| | | |
|---|---|---|
| DE | 10 2005 044 875 | 10/2006 |
| DE | 10 2006 018 053 | 10/2007 |
| JP | 2009303298 | 12/2009 |

OTHER PUBLICATIONS

International Search Report corresponding to International Application No. PCT/EP2010/069126, dated Jul. 20, 2011.

*Primary Examiner* — Rina Duda
(74) *Attorney, Agent, or Firm* — RatnerPrestia

(57) ABSTRACT

A circuit arrangement for an electrical machine having a plurality of stator windings, with each stator winding including at least a first winding phase and a second winding phase. The circuit arrangement includes at least a prespecified first and a prespecified second selection of in each case a plurality of half-bridges. A common connection of the two switching elements of the respective half-bridge of the first selection can be electrically coupled in each case to a connection of the first winding phase of the respectively associated stator winding. A common connection of the two switching elements of the respective half-bridge of the second selection can be electrically coupled in each case to a connection of the second winding phase of the respective associated stator winding.

8 Claims, 2 Drawing Sheets

(56) References Cited

U.S. PATENT DOCUMENTS

| | | |
|---|---|---|
| 2005/0049770 A1 | 3/2005 | Liu et al. |
| 2006/0219470 A1 | 10/2006 | Imagawa et al. |
| 2009/0033258 A1* | 2/2009 | Atarashi .................. 318/400.3 |
| 2009/0099703 A1 | 4/2009 | Rehm et al. |
| 2009/0302792 A1 | 12/2009 | Osada |

* cited by examiner

CIRCUIT ARRANGEMENT AND METHOD AND DEVICE FOR OPERATING THE CIRCUIT ARRANGEMENT

CROSS REFERENCE TO RELATED APPLICATIONS

This application is the U.S. National Phase Application of PCT International Application No. PCT/EP2010/069126, filed Dec. 8, 2010, which claims priority to German Patent Application no. 10 2010 001 593.8, filed Feb. 4, 2010, the contents of such applications being incorporated by reference herein.

FIELD OF THE INVENTION

The invention relates to a circuit arrangement for an electrical machine and to a method and to a device for operating the circuit arrangement.

BACKGROUND OF THE INVENTION

Electrical machines, for example electric motors, are used, for example, in the field or automobile engineering where they are employed within a steering system for assisting a prespecified steering movement, for example. Electrical machines of this kind can be designed, for example, as permanent-magnet brushless synchronous machines.

SUMMARY OF THE INVENTION

An aim on which the invention is based is that of providing a circuit arrangement and a method and a corresponding device which enables an electrical machine to be operated in a reliable manner.

According to a first aspect, the invention is distinguished by a circuit arrangement for an electrical machine which comprises a plurality of stator windings. Each stator winding comprises at least a first winding phase and a second winding phase. The circuit arrangement comprises at least a prespecified first and a prespecified second selection of in each case a plurality of half-bridges. Each half-bridge has a first switching element and a second switching element which is coupled to said first switching element electrically in series. A common connection of the two switching elements of the respective half-bridge of the first selection can be electrically coupled in each case to a connection of the first winding phase of the respective associated stator winding. In each case different stator windings are associated with the half-bridges of the first selection. A common connection of the two switching elements of the respective half-bridge of the second selection can be electrically coupled in each case to a connection of the second winding phase of the respective associated stator winding. In each case different stator windings are associated with the half-bridges of the second selection. A circuit arrangement of this kind allows for reliable operation and a relatively high availability of the electrical machine. In particular, additional components are typically no longer required in the electrical machine, for example star-point relays which are provided if there is a fault. This allows for a simple and cost-effective electrical machine.

The electrical machine is designed, for example, as a permanent-magnet synchronous machine. The connections of the phase windings, which connections are averted from the half-bridges, are preferably electrically coupled to one another at a common electrical star point. Furthermore, a freewheeling diode which is arranged electrically in parallel is typically associated with each switching element of the half-bridges. The number of half-bridges is preferably correlated with the number of stator windings depending on the selection. A different stator winding is preferably associated with each half-bridge of the respective selection.

According to a second and third aspect, the invention is distinguished by a method and a corresponding device for operating a circuit arrangement according to the first aspect, in which method at least one prespecified characteristic variable of the circuit arrangement is recorded, and an error of a switching element either of the first or second selection is detected as a function of the at least one recorded characteristic variable. A braking torque results on the rotor from the error at least during a rotation of a rotor of the electrical machine. At least one error-free switching element of the respectively error-free selection is driven as a function of the detection of the error in such a way that a prespecified compensation current is supplied to the respectively associated winding phase in such a way that this results in an associated countertorque which counteracts the braking torque. When there is an error, this can prevent blocking of rotation of the rotor of the electrical machine. In particular, the error can lead to the electrical machine being operated as a generator, as a result of which a current which results in the braking torque is typically provided. The characteristic variable can be represented, for example, by an operating variable of the circuit arrangement. Driving of the respective switching element preferably represents switch-on of this switching element.

In an advantageous refinement of the second and third aspect, at least one operating variable of the electrical machine is determined. The at least one error-free switching element is driven as a function of the at least one determined operating variable. This allows for the compensation current to be matched to a current operating state of the electrical machine. A number of error-free switching elements which are to be driven and/or a switch-on time of the at least one error-free switching element can, for example, be prespecified as a function of the at least one determined operating variable.

In an advantageous refinement of the second and third aspect, a current rotation speed and/or a current angular position of the rotor and/or a direction of rotation of the rotor are/is determined as at least one operating variable of the electrical machine. By determining these operating variables, it is particularly advantageously possible to determine the driving of the at least one error-free switching element.

In an advantageous refinement of the second and third aspect, all the remaining switching elements of the selection which contains the faulty switching element are adjusted to a high-impedance switching state as a function of the error being detected. This can reduce a further influence of this selection on the development of the braking torque.

In an advantageous refinement of the second and third aspect, a permanent low-impedance switching state is detected as the error in the switching element. This error preferably contributes to the development of the braking torque. Detection of this error and provision of the countertorque as a function of this can prevent blocking of the rotor.

In an advantageous refinement of the second and third aspect, half-bridge voltages are recorded as prespecified characteristic variables of the circuit arrangement. A half-bridge voltage is associated with in each case one half-bridge and represents a voltage which is associated with the common connection of the two switching elements of the respective half-bridge. This allows for the error, in particular the permanent low-impedance switching state of the faulty switching element, to be determined in a particular reliable manner.

In an advantageous refinement of the second and third aspect, the compensation current is prespecified in such a way that the countertorque is equal to the braking torque. This allows for the rotor to continue to be rotated.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Elements with the same design or function are provided with the same reference signs throughout the figures.

Figure 1:
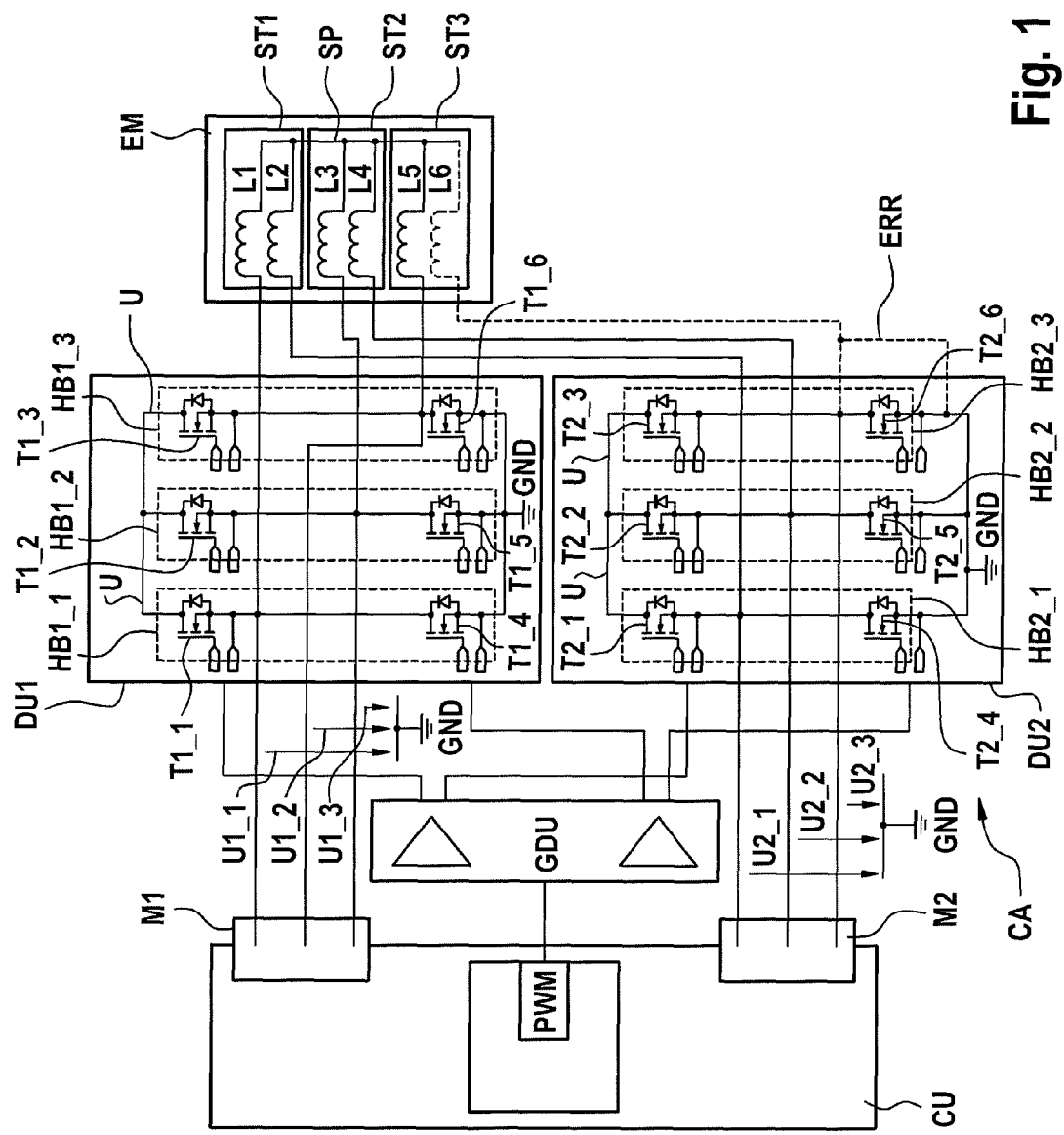
FIG. 1 shows a circuit arrangement.

A circuit arrangement CA (FIG. 1) for an electrical machine EM has a first and a second driver stage DU1, DU2 which in each case comprise a B6 bridge for driving the electrical machine EM. The circuit arrangement CA can be associated with, by way of example, a steering system, for example a power steering system, of a motor vehicle.

Each driver stage DU1, DU2 has in each case three half-bridges HB1_1-HB1_3, H2_1-H2_3. Each half-bridge HB1_1-HB1_3, H2_1-H2_3 in turn has in each case one first switching element T1_1, T1_2, T1_3 and a second switching element T1_4, T1_5, T1_6, these switching elements being connected electrically in series and in each case having a common connection. The first driver stage DU1 can also be designated a first selection of a plurality of half-bridges, and the second driver stage DU2 can also be designated a second selection of a plurality of half-bridges. Each half-bridge is electrically coupled between a supply potential U, for example 12 V, and a reference potential GND which is in the form, for example, of the mass of the motor vehicle.

The respective switching elements T1_1-T1_6, T2_1-T2_6 of the half-bridges HB1_1-HB1_3, H2_1-H2_3 are designed, by way of example, as power transistors, for example as power field-effect transistors, and have in each case a freewheeling diode which is coupled electrically in parallel to non-control connections of the respective switching element.

The electrical machine EM is designed, for example, as a permanent-magnet brushless synchronous machine which comprises, for example, three stator windings ST1, ST2, ST3. Each stator winding ST1, ST2, ST3 comprises a first winding phase L1, L3, L5 and a second winding phase L2, L4, L6. All the winding phases L1-L6 have in each case two connections, with all the winding phases L1-L6 being electrically coupled to one another by way of one of their two connections at a star point SP.

The common connection of the two switching elements of the respective half-bridge HB1_1, HB1_2, HB1_3 of the first driver stage DU1 can be electrically coupled to the first winding phase L1, L3, L5 of the respective associated stator winding ST1, ST2, ST3. The common connection of the two switching elements of the respective half-bridge HB2_1, HB2_2, HB2_3 of the second driver stage DU2 can be electrically coupled to the second winding phase L2, L4, L6 of the respective associated stator winding ST1, ST2, ST3. In this case, each half-bridge HB1_1-HB1_3 of the first driver stage DU1 is associated with a different stator winding ST1-ST3 and each half-bridge HB2_1-HB2_3 of the second driver stage DU2 is associated with a different stator winding ST1-ST3.

Furthermore, the circuit arrangement CA has a driver unit GDU which has a plurality of input connections and a plurality of output connections. Each output connection is associated with a control input of a switching element. In an error-free state, the first switching elements T1_1-T1_3, T2_1-T2_3, which are associated with the same stator winding ST1, ST2, ST3, are preferably driven in parallel with respect to time. For example, the first switching element T1_1 of the first half-bridge HB1_1 is associated with the first stator winding ST1 in the first driver stage DU1 and the first switching element T2_1 of the first half-bridge H2_1 is associated with the first stator winding ST1 in the second driver stage DU2, and therefore said switching elements are driven in parallel with respect to time. If, however, there is an error, for example, the first switching elements which are respectively associated with one another can also be driven differently. The same applies to the second switching elements.

The driver unit GDU is electrically coupled to a pulse-width-modulation unit PWM of a control unit CU by means of the input connections. The control unit CU is designed to provide a plurality of prespecified pulse-width-modulated control signals to the driver unit GDU by means of the pulse-width-modulation unit PWM. The control signals for the switching elements are provided by means of the driver unit GDU as a function of the prespecified pulse-width-modulated control signals. A torque, a rotation speed n and a direction of rotation of a rotor of the electrical machine EM, for example, can be prespecified by prespecifying the prespecified pulse-width-modulated control signals. As a result, a prespecified steering movement of a driver of the motor vehicle can be assisted, for example. In this case, the driver unit GDU is designed, for example, to amplify the pulse-width-modulated control signals which are provided at the input end and/or to add dead times in order to prevent low-impedance coupling between the supply potential U and the reference potential GND by the switching elements of a respective half-bridge.

The circuit arrangement CA also has recording units M1, M2 which are associated with the control unit CU and which are in each case electrically coupled to one of the driver stages DU1, DU2. The respective recording unit M1, M2 is designed to record a half-bridge voltage U1_1-U1_3, U2_1-U2_3 of each half-bridge which is associated with it. The respective half-bridge voltage U1_1-U1_3, U2_1-U2_3 represents a voltage between the common connection of the switching elements of in each case an associated half-bridge and the reference potential GND.

Figure 2:
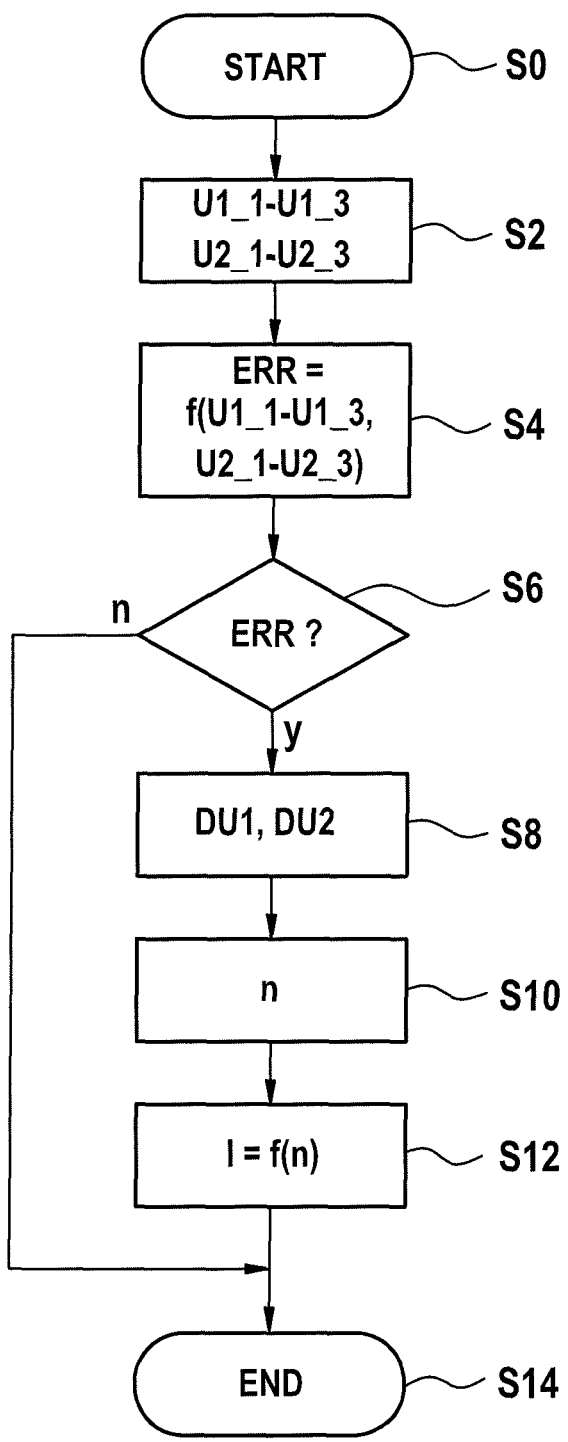
FIG. 2 shows a flowchart.

A program which is implemented, for example by the control unit CU, in order to operate the circuit arrangement CA is described with reference to a flowchart (FIG. 2). The control unit CU can also be designated a device for operating the circuit arrangement CA.

The program is started in a step S0. The half-bridge voltages U1_1-U1_3, U2_1-U2_3 are recorded as characteristic variables of the circuit arrangement CA by means of the recording units M1, M2 in a step S2. In a step S4, it is determined whether there is an error ERR in a switching element either of the first driver stage DU1 or of the second driver stage DU2 as a function of the recorded half-bridge voltages U1_1-U1_3, U2_1-U2_3. This can be performed, for example, by the recorded half-bridge voltages U1_1-U1_3, U2_1-U2_3 being compared with prespecified voltages and a probability of there being a faulty switching element as the source of the error ERR being determined as a function of deviations in voltage over time. In this case, a permanent low-impedance switching state of the faulty switching element is preferably imposed in a step S6.

In the event of a steering movement by the driver, the error ERR can lead to generator operation of the electrical machine EM as a function of a current position and rotation speed n of the rotor, this resulting in a braking torque which counteracts a steering torque which is associated with the steering movement of the driver and possibly leading to blocking of the steering of the motor vehicle. In this case, the braking torque is typically greater the faster the rotor is rotated. In this case, the rotor can reach rotation speeds of, for example, 30° per second given a corresponding steering movement by the driver and mechanical coupling of the electrical machine EM to a steering wheel which is operated by the driver.

If, for example, the switching element T2_3 is in a permanent low-impedance switching state, a voltage can be induced during generator operation as a function of the current position, rotation speed n and direction of rotation of the electrical machine EM, for example in the stator winding ST3, it being possible for this voltage to lead to the freewheeling diode, for example, of the switching element T1_3 being operated in the forward direction, and therefore a current flow resulting, the braking torque which counteracts the steering torque again resulting from this current flow. Preferably all the remaining switching elements of the driver stage which has the faulty switching element are adjusted to a high-impedance switching state in a step S8, the steering assistance being deactivated as a result of this. This can be performed, for example, by corresponding driving of the driver unit GDU by means of the control unit CU.

At least one operating variable of the electrical machine EM, for example the current rotation speed n and/or the current position of the rotor and/or the direction of rotation of the rotor of the electrical machine EM, is determined in a step S10. A value of a compensation current I, in particular a value of an amplitude of the compensation current I, is determined as a function of the determined at least one operating variable in a step S12. To this end, at least one error-free switching element of the driver stage which does not have the faulty switching element is driven as a function of the determined value of the compensation current I in step S12. By driving this at least one error-free switching element, the compensation current I is supplied to at least one stator winding of the electrical machine EM in such a way that a compensation torque which at least partially counteracts the braking torque results. The compensation current I is preferably determined in such a way that the amplitude thereof is of equal magnitude to an amplitude of the current which results from the generator operation of the electrical machine EM in the event of an error, and therefore the resulting compensation torque is equal to the braking torque. This can be performed, for example, as part of a field-weakening operation of the electrical machine EM. The program is terminated in a step S14. As an alternative, said program can also be conducted again from step S2.

On account of the provision of the compensation torque, the motor vehicle can typically still be steered even when an error ERR is present, even without steering assistance.

| List of reference symbols | |
|---|---|
| CA | Circuit arrangement |
| CU | Control unit |
| DU1, DU2 | Driver stage |
| EM | Electrical machine |
| ERR | Error |

-continued

| List of reference symbols | |
|---|---|
| GDU | Driver unit |
| GND | Reference potential |
| H1_1-H1_3, H2_1-H2_3 | Half-bridge |
| I | Compensation current |
| L1-L6 | Winding phases |
| M1, M2 | Recording unit |
| n | Rotation speed |
| PWM | Pulse-width-modulation unit |
| SP | Star point |
| ST1, ST2, ST3 | Stator winding |
| T1_1-T1_6, T2_1-T2_6 | Switching element |
| U | Supply potential |
| U1_1-U1_3, U2_1-U2_3 | Half-bridge voltage |

The invention claimed is:

1. A device for operating a circuit arrangement for an electrical machine which comprises a plurality of stator windings, with each stator winding comprising at least a first winding phase and a second winding phase, with the circuit arrangement comprising at least a prespecified first and a prespecified second selection of in each case a plurality of half-bridges, with each half-bridge having a first switching element and a second switching element which is coupled to said first switching element electrically in series, a capability for a common connection of the two switching elements of the respective half-bridge of the first selection to be electrically coupled in each case to a connection of the first winding phase of the respective associated stator winding, and within each case different stator windings being associated with the half-bridges of the first selection, and a capability for a common connection of the two switching elements of the respective half-bridge of the second selection to be electrically coupled in each case to a connection of the second winding phase of the respective associated stator winding, and within each case different stator windings being associated with the half-bridges of the second selection, the device comprising:

a detector configured to detect an error in a switching element either of the first or second selection, a braking torque resulting on the rotor from said error at least during a rotation of a rotor of the electrical machine, and a driver configured to drive at least one error-free switching element of the respectively error-free selection as a function of the detection of the error in such a way that a prespecified compensation current is supplied at least to an associated winding phase in such a way that this results in an associated countertorque which counteracts the braking torque.

2. A method for operating a circuit arrangement for an electrical machine which comprises a plurality of stator windings, with each stator winding comprising at least a first winding phase and a second winding phase, the circuit arrangement comprising a plurality of stator windings, with each stator winding comprising at least a first winding phase and a second winding phase, with the circuit arrangement comprising at least a prespecified first and a prespecified second selection of in each case a plurality of half-bridges, with each half-bridge having a first switching element and a second switching element which is coupled to said first switching element electrically in series, a capability for a common connection of the two switching elements of the respective half-bridge of the first selection to be electrically coupled in each case to a connection of the first winding phase of the respective associated stator winding, and within each case different stator windings being associated with the half-bridges of the first selection, and a capability for a common connection of the two switching elements of the respective half-bridge of the second selection to be electrically coupled in each case to a connection of the second winding phase of the respective associated stator winding, and within each case different stator windings being associated with the half-bridges of the second selection, the method comprising:

recording at least one prespecified characteristic variable of the circuit arrangement, detecting an error of a switching element either of the first or second selection as a function of the at least one recorded characteristic variable, a braking torque resulting on the rotor from said error at least during a rotation of a rotor of the electrical machine, and driving at least one error-free switching element of the respectively error-free selection as a function of the detection of the error in such a way that a prespecified compensation current is supplied to the respectively associated winding phase in such a way that this results in an associated countertorque which counteracts the braking torque.

3. The method as claimed in claim 2, further comprising determining at least one operating variable of the electrical machine, and driving the at least one error-free switching element as a function of the at least one determined operating variable.

4. The method as claimed in claim 3, further comprising determining at least one of a current rotation speed, a current angular position of the rotor and a direction of rotation of the rotor as at least one operating variable of the electrical machine.

5. The method as claimed in claim 2, in which all the remaining switching elements of the selection which contains the faulty switching element are adjusted to a high-impedance switching state as a function of the error being detected.

6. The method as claimed in claim 2, in which a permanent low-impedance switching state is detected as the error in the switching element.

7. The method as claimed claim 2, in which half-bridge voltages are recorded as prespecified characteristic variables of the circuit arrangement, with a half-bridge voltage being associated with in each case one half-bridge and representing a voltage which is associated with the common connection of the two switching elements of the respective half-bridge.

8. The method as claimed in claim 2, in which the compensation current is prespecified in such a way that the countertorque is equal to the braking torque.

* * * * *